(12) United States Patent
Moulsley

(10) Patent No.: US 11,632,748 B2
(45) Date of Patent: *Apr. 18, 2023

(54) CONTROL CHANNELS FOR WIRELESS COMMUNICATION

(71) Applicant: FUJITSU LIMITED, Kawasaki (JP)

(72) Inventor: Timothy Moulsley, Caterham (GB)

(73) Assignee: FUJITSU LIMITED, Kawasaki (JP)

( * ) Notice: Subject to any disclaimer, the term of this patent is extended or adjusted under 35 U.S.C. 154(b) by 349 days.

This patent is subject to a terminal disclaimer.

(21) Appl. No.: 16/945,616

(22) Filed: Jul. 31, 2020

(65) Prior Publication Data

US 2020/0367211 A1   Nov. 19, 2020

Related U.S. Application Data

(63) Continuation of application No. 15/879,086, filed on Jan. 24, 2018, now Pat. No. 10,772,088, which is a
(Continued)

(30) Foreign Application Priority Data

Aug. 2, 2012 (EP) ..................................... 12179108

(51) Int. Cl.
*H04W 72/04* (2009.01)
*H04L 5/00* (2006.01)

(52) U.S. Cl.
CPC ......... *H04W 72/042* (2013.01); *H04L 5/0053* (2013.01); *H04L 5/0096* (2013.01)

(58) Field of Classification Search
CPC ................................ H04W 72/00; H04L 5/00
See application file for complete search history.

(56) References Cited

U.S. PATENT DOCUMENTS

2007/0291797 A1\* 12/2007 Rao ....................... H04L 1/1887
370/503
2010/0214990 A1   8/2010 Fukui
(Continued)

FOREIGN PATENT DOCUMENTS

CN         101860426 A      10/2010
EP         2 437 422 A1       4/2012
(Continued)

OTHER PUBLICATIONS

Research in Motion, 3GPP TSG RAN WG1 Meeting#68, Feb. 6-8, 2012, R1-120330 (Year: 2012).\*
(Continued)

*Primary Examiner* — Derrick W Ferris
*Assistant Examiner* — Sumitra Ganguly
(74) *Attorney, Agent, or Firm* — Myers Wolin, LLC

(57) ABSTRACT

Wireless communication where a wireless network transmits a control channel message to a terminal. A receiver to receive the control channel message located in one or more control channel elements within a plurality of search spaces, each of the plurality of search spaces being configured from a plurality of control channel elements within a time interval for scheduling decision by using a pseudorandom function. A decoder to decode the control channel message by making a selection of locations for blind decoding the plurality of search spaces within the sub-frame, using the pseudorandom function, wherein, the pseudo-random function is a function based on a sum of a first value and a second value, wherein the first value is a pseudo-random factor, and the second value is based on an aggregation level and a total of control channel elements in a sub-frame.

13 Claims, 6 Drawing Sheets

102
Configure SS for each candidate

104
Pseudo-random selection of location in each SS

106
Determine candidate to use for control channel message

108
Transmit control channel message at determined location

Related U.S. Application Data continuation of application No. 14/604,968, filed on Jan. 26, 2015, now Pat. No. 9,924,505, which is a continuation of application No. PCT/EP2013/063957, filed on Jul. 2, 2013.

(56) References Cited

U.S. PATENT DOCUMENTS

| | | | |
|---|---|---|---|
| 2011/0110316 A1 | 5/2011 | Chen et al. | |
| 2011/0171985 A1* | 7/2011 | Papasakellariou | H04W 72/02 455/509 |
| 2012/0127946 A1* | 5/2012 | Nishio | H04L 5/0053 370/329 |
| 2013/0016653 A1 | 1/2013 | Kim et al. | |

FOREIGN PATENT DOCUMENTS

| | | | |
|---|---|---|---|
| WO | 2011/021379 A1 | 2/2011 | |
| WO | 2011/129537 A2 | 10/2011 | |
| WO | 2012/041467 A1 | 4/2012 | |
| WO | WO-2012041467 A1 * | 4/2012 | ........... H04L 27/261 |

OTHER PUBLICATIONS

Extended European Search Report and the European Search Opinion issued for corresponding European Patent Application No. 12179198.1, dated Oct. 30, 2012.

Research in Motion, UK Limited, "Search Space Design for E-PDCCH", Agenda Item: 7.6.3, 3GPP TSG RAN WG1 Meeting #68, R1-120330, Dresden, Germany, Feb. 6-10, 2010.

NTT DOCOMO, "Search Space Design for ePDCCH Transmission Schemes", Agenda Item: 7.6.4.3, 3GPP TSG RAN WG1 Meeting#69, R1-122899, Prague, Czech Republic, May 21-25, 2012.

ZTE, "Discussion on ePDCCH candidates design", Agenda Item: 7.6.4.3, 3GPP TSG RAN WG1 Meeting #69, R1-122106, Prague, Czech Republic, May 21-25, 2012.

ETSI TS 136 211 V8.7.0, Technical Specification, "LTE; Evolved Universal Terrestrial Radio Access (E-UTRA); Physical channels and modulation (3GPP TS 36.211 version 8.7.0 Release 8)", Jun. 2009.

ETSI TS 136 212 V8.8.0, Technical Specification, "LTE; Evolved Universal Terrestrial Radio Access (E-UTRA); Multiplexing and channel coding (GPP TS 36.212 version 8.8.0 Release 8)", Jan. 2010.

ETSI TS 136 213 V8.3.0, Technical Specification, "LTE; Evolved Universal Terrestrial Radio Access (E-UTRA); Physical layer procedures (GPP TS 36.213 version 8.3.0 Release 8)", Nov. 2008.

ETSI TS 136 321 V8.7.0, Technical Specification, "LTE; Evolved Universal Terrestrial Radio Access (E-UTRA); Medium Access Control (MAC) protocol specification (3GPP TS 36.321 version 8.7.0 Release 8)", Sep. 2009.

Hosein, Patrick, Huawei Technologies Co., Ltd., "Resource Allocation for the LTE Physical Downlink Control Channel", IEEE Conference, 2009.

Steepest Ascent Ltd., "LTE Toolbox PDCCH Blind Decoding", http://www.steepestascent.com, (Copyright 2009-2011).

Steepest Ascent Ltd., "LTE Toolbox Control signaling Downlink Control Channel", http://www.steepestascent.com, (Copyright 2009-2011).

International Search Report with written opinion issued for corresponding International Patent Application No. PCT/EP2013/063957, dated Aug. 26, 2013.

Notice of Reasons for Rejection issued for corresponding Japanese Patent Application No. 2015-524692 dated Apr. 5, 2016 with an English translation.

Research in Motion et al., "Consideration on E-PDCCH Search Space and Multiplexing Design", Agenda Item: 7.6.4, 3GPP TSG RAN WG1 Meeting #69, R1-122721, Prague, Czech Republic, May 21-25, 2012.

First Notification of Office Action issued by the State Intellectual Property Office of China for corresponding Chinese Patent Application No. 201380040420.6, dated Feb. 3, 2017, with an English translation.

Notification of Reasons for Refusal issued by the Japan Patent Office for corresponding Japanese Patent Application No. 2016-197533, dated Jan. 9, 2018, with an English translation.

Research in Motion, UK Limited, "Support Common Control Channel in E-PDCCH", Agenda Item: 7.8.2, 3GPP TSG-RAN WG1 Meeting #68bis, R1-121479, Jeju, Korea, Mar. 26-30, 2012.

Non-Final Office Action issued by the United States Patent and Trademark Office for corresponding U.S. Appl. No. 14/604,968, dated Jul. 27, 2016.

Final Office Action issued by the United States Patent and Trademark Office for corresponding U.S. Appl. No. 14/604,968, dated Apr. 20, 2017.

Notice of Allowance issued by the United States Patent and Trademark Office for corresponding U.S. Appl. No. 14/604,968, dated Nov. 15, 2017.

NTT DOCOMO, Investigation on UE-Specific Search Space for Carrier Aggregation, 3GPP TSG RAN WG1 Meeting #61bis, R1-104012, Agenda Item: 6.2.3.1, Jun. 28-Jul. 2, 2010, Dresden, Germany.

Communication pursuant to Article 94(3) EPC issued for corresponding European Patent Application No. 17 167 595.2, dated Aug. 5, 2019.

First Notification of Office Action issued by the China National Intellectual Property Administration for corresponding Chinese Patent Application No. 201711171541.0, dated Mar. 30, 2020, with an English translation.

Notification of Reasons for Rejection issued by the Japan Patent Office for corresponding Japanese Patent Application No. 2016-197533, dated Sep. 11, 2018, with an English translation.

* cited by examiner

CONTROL CHANNELS FOR WIRELESS COMMUNICATION

CROSS REFERENCES TO RELATED APPLICATIONS

This application is a continuation of U.S. application Ser. No. 15/879,086, filed Jan. 24, 2018, currently pending, which is a continuation of U.S. application Ser. No. 14/604,968, filed Jan. 26, 2015, now U.S. Pat. No. 9,924,505, which is a continuation of International Application PCT/EP2013/063957, filed on Jul. 2, 2013, which claims foreign priority to European Patent Application No. EP12179108.1, filed on Aug. 2, 2012, the contents of each are herein wholly incorporated by reference.

FIELD OF THE INVENTION

Certain embodiments herein relate to wireless communication systems, for example systems based on the 3GPP Long Term Evolution (LTE) and 3GPP LTE-A groups of standards.

BACKGROUND

Wireless communication systems are widely known in which base stations (BSs) form "cells" and communicate with terminals (called user equipments or UEs in LTE) within range of the BSs.

In such a system, each BS divides its available bandwidth, i.e. frequency and time resources in a given cell, into individual resource allocations for the user equipments which it serves. The user equipments are generally mobile and therefore may move among the cells, prompting a need for handovers of radio communication links between the base stations of adjacent cells. A user equipment may be in range of (i.e. able to detect signals from) several cells at the same time, but in the simplest case it communicates with one "serving" or "primary" cell.

For assisting understanding of the inventive concepts to be described later, some outline will be given of some of the features of LTE which are of particular relevance to certain embodiments herein. However, it is to be understood that the present invention is not restricted to use in LTE.

Basic LTE Network Topology

The network topology in LTE is illustrated in FIG. 1. As can be seen, each terminal or UE 12 connects over a wireless link via a Uu interface to a base station or eNB 11, and the network of eNBs is referred to as the eUTRAN 10.

Each eNB 11 in turn is connected by a (usually) wired link using an interface called S1 to higher-level or "core network" entities, including a Serving Gateway (S-GW 22), and a Mobility Management Entity (MME 21) for managing the system and sending control signalling to other nodes, particularly eNBs, in the network. In addition, a PDN or Packet Data Network Gateway (P-GW) is present, separately or combined with the S-GW 22, to exchange data packets with any packet data network including the Internet. The core network 20 is called the EPC or Evolved Packet Core.

For assisting understanding of the inventive concepts to be described later, some outline will be given of some specific aspects or features of LTE which are of particular relevance to certain embodiments herein. Further details of the features outlined below are given by the following documents, hereby incorporated by reference: —

3GPP TS 36.211: "Evolved Universal Terrestrial Radio Access (E-UTRA); Physical channels and modulation"
3GPP TS 36.212: "Evolved Universal Terrestrial Radio Access (E-UTRA); Multiplexing and channel coding"
3GPP TS 36.213: "Evolved Universal Terrestrial Radio Access (E-UTRA); Physical layer procedures"
3GPP TS 36.321: "Evolved Universal Terrestrial Radio Access (E-UTRA); Medium Access Control (MAC) protocol specification"

Frame Structure and Resource Blocks

In the downlink of an LTE system, in other words the direction of transmission from the base station (eNB) towards the user equipments (UEs), individual OFDM sub-carriers or sets of subcarriers are assigned to different user equipments. The result is a multi-access system referred to as OFDMA (Orthogonal Frequency Division Multiple Access). By assigning distinct frequency/time resources to each user equipment in a cell, OFDMA can substantially avoid interference among the users served within a given cell.

The UEs are allocated a specific number of subcarriers for a predetermined amount of time. An amount of resource consisting of a set number of subcarriers and OFDM symbols is referred to as a physical resource block (PRB) in LTE. PRBs thus have both a time and frequency dimension. Allocation of RBs is handled by a scheduling function (scheduler) at the eNB.

Data for transmission on the downlink is organised in OFDMA frames each divided into a number of sub-frames. Various frame types are possible and differ between frequency division duplex (FDD) and time division duplex (TDD) for example. In FDD, transmission and/or reception may occur simultaneously on DL and UL using different carrier frequencies, whilst in TDD downlink and uplink transmissions occur on the same carrier frequency and are separated in time. An FDD frame consists of 10 uplink subframes and 10 downlink subframes occurring simultaneously. In TDD, various allocations of subframes to downlink and uplink are possible, depending on the load conditions. Subframes may consequently be referred to as uplink subframes or downlink subframes.

FIG. 2 shows a generic frame structure for LTE, applicable to the downlink, in which the 10 ms frame is divided into 20 equally sized slots of 0.5 ms. A sub-frame SF consists of two consecutive slots, so one radio frame contains 10 sub-frames. The UEs are allocated, by a scheduling function at the eNB, a specific number of subcarriers for a predetermined amount of time. Such allocations typically apply to each subframe. Resources are allocated to UEs both for downlink and uplink transmission (i.e. for both downlink subframes and uplink subframes).

The transmitted signal in each slot is described by a resource grid of sub-carriers and available OFDM symbols, as shown in FIG. 3. Each element in the resource grid is called a resource element (RE) and each resource element corresponds to one symbol.

For each transmission time interval of 1 ms, a new scheduling decision is taken regarding which UEs are assigned to which time/frequency resources during this transmission time interval, the scheduling being made in units of resource blocks, also called Physical Resource Blocks, PRBs. As shown in FIG. 3, one physical resource block is usually defined as 7 consecutive OFDM symbols in the time domain and 12 consecutive sub-carriers in the frequency domain. Several resource blocks may be allocated to the same UE, and these resource blocks do not have to be contiguous with each other. Scheduling decisions are taken at the eNB, using a scheduling algorithm which takes into account the radio link quality situation of different UEs, the overall interference situation, Quality of Service requirements, service priorities, etc.

FIG. 3 shows that a PRB is composed of multiple resource elements REs of time duration equal to one OFDM symbol and extending over one subcarrier in the frequency domain. In LTE, data and control channels may be transmitted using a subset of the REs in one or more PRBs. PRBs are often considered in pairs, where a PRB pair consists of two PRBs, adjacent in the time domain, and in the same subframe. A unit of resource used in describing control channel transmission is a control channel element or CCE, which consists of a number of Resource Element Groups or REGs.

According to the above mentioned 3GPP TS36.211, section 6.2.4, resource-element groups (REGs) are used for defining the mapping of control channels (see below) to resource elements.

PDCCH

In LTE, several channels for data and control signalling are defined at various levels of abstraction within the system. FIG. 4 shows some of the channels defined in LTE at each of a logical level, transport layer level and physical layer level, and the mappings between them. For present purposes, the downlink channel PDCCH at the physical layer level is of most interest.

On the downlink, user data is carried on the Physical Downlink Shared Channel, PDSCH, which conventionally is distinct from (i.e. does not include) the Physical Downlink Control Channel, PDCCH.

In LTE, both the DL and UL are fully scheduled since the DL and UL traffic channels are dynamically shared channels. This means that PDCCH must provide scheduling information to indicate which users should decode the physical DL shared channel (PDSCH) in each sub-frame and which users are allowed to transmit on the physical UL shared channel (PUSCH) in each sub-frame. PDCCH is used to carry scheduling information—called downlink control information, DCI—from eNBs to individual UEs. Conventionally, one PDCCH message contains one DCI format. This is often intended for one individual UE, but some messages are also broadcast (for example intended for multiple UEs within a cell). Thus PDCCH can also contain information intended for a group of UEs, such as Transmit Power Control (TPC) commands. In addition the PDCCH can be used to configure a semi-persistent schedule (SPS), where the same resources are available on a periodic basis. Below, the terms PDCCH, PDCCH message, DCI and DCI message are used interchangeably unless the context demands otherwise.

Reference was made earlier to CCEs and REGs. PDCCH is transmitted on an aggregation of one or several consecutive CCEs, where a control channel element corresponds to 9 REGs. Thus, at a minimum, PDCCH may occupy a single CCE; the number of CCEs employed is referred to as the "aggregation level" (1, 2, 4 or 8). The number of resource-element groups not assigned to PCFICH or PHICH is $N_{REG}$. The CCEs available in the system are numbered from 0 to $N_{CCE}-1$, where $N_{CCE}=\lfloor N_{REG}/9 \rfloor$ Although the REGs used for PDCCH may be initially adjacent, an interleaver is applied to spread the REGs across the frequency domain. Therefore, PDCCH will typically be transmitted using a set of REGs spread across the whole system bandwidth and all the symbols reserved for PDCCH. In LTE up to four OFDM symbols may be reserved for PDCCH at the start of the first PRB of a PRB pair.

A cyclic redundancy check (CRC) is used for error detection of the DCI. The entire PDCCH payload is used to calculate a set of CRC parity bits, which are then appended to the end of the PDCCH payload.

As multiple PDCCHs relevant to different UEs can be present in one sub-frame, the CRC is also used to specify which UE a PDCCH is relevant to. This is done by scrambling the CRC parity bits with a Radio Network Temporary Identifier (RNTI) of the UE. The RNTI is thus associated with the PDCCH and the DCI. Various kinds or RNTI are defined in the 3GPP documents cited earlier. Depending on the purpose of the DCI message, different DCI formats are defined. The DCI formats include:

Format 0 for transmission of uplink shared channel (UL-SCH) allocation

Format 1 for transmission of DL-SCH allocation for Single Input Multiple Output (SIMO) operation Format 1A for compact transmission of DL-SCH allocation for SIMO operation or allocating a dedicated preamble signature to a UE for the RACH procedure Format 3 and format 3A for transmission of TPC command for an uplink channel.

The Table below, taken from the above mentioned 3GPP TS36.211, section 6.8.1, shows the PDCCH formats supported in LTE.

| PDCCH format | Number of CCEs (aggregation level) | Number of resource-element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

A PDCCH consisting of n consecutive CCEs may only start on a CCE fulfilling i mod n=0, where i is the CCE number, and multiple PDCCHs can be transmitted in a subframe.

Thus, the DCI format to be used depends on the purpose of the control message. For example, DCI Format 1 is used for the assignment of a downlink shared channel resource when no spatial multiplexing is used (i.e. the scheduling information is provided for one code word transmitted using one spatial layer only). The information provided enables the UE to identify the resources, where to receive the PDSCH in that sub-frame, and how to decode it. Besides the resource block assignment, this also includes information on the modulation and coding scheme and on the hybrid ARQ protocol used to manage retransmission of non-received data.

DCI Formats 3 and 3A carry multiple power control bits representing multiple power control commands, each power control command being intended for a different UE. The main application of interest for Formats 3 and 3A is to support SPS in the uplink (since UE specific PDCCH DCI formats to carry power control commands are not then required). Since, as already mentioned, multiple UEs can be scheduled within the same sub-frame, conventionally therefore multiple DCI messages are sent using multiple PDCCHs.

Without any additional restrictions a UE would need to check all possible combinations of PDCCH locations, PDCCH formats, and DCI formats and act on those message with correct CRCs (taking into account that the CRC is scrambled with a RNTI). This is called "blind decoding". In UESS the number of blind decoding candidates for aggregation levels 1, 2, 4, and 8 are 6, 6, 2 and 2 respectively. In the CSS only aggregation levels 4 and 8 are used and the numbers of candidates are 4 and 2 respectively.

To reduce the required amount of blind decoding of all the possible combinations, for each UE a limited set of CCE locations is defined where a PDCCH may be placed. The set of CCE locations in which the UE may find its PDCCH is called the "search space", and in LTE, separate UE-specific search spaces (UESSS) and common search spaces (CSS) are defined. The CSS is typically used for DCI messages intended for more than one UE, while the UESSS is typically used for DCI messages intended for a single UE.

These locations are also referred to below as "candidate locations" or simply "candidates". For understanding certain embodiments to be described, it is important to note that there is a distinction between "candidate locations" and the actual location which the eNB uses for the DCI message. Each candidate corresponds to one blind decoding attempt in a given location by the UE, as distinct from the selection of a location (from the available candidates) by the eNB for actual transmission of a DCI message.

In general a "location" in the context of PDCCH can be understood to correspond to a set of resource elements in which a DCI message may be transmitted, and which can also correspond to a set of REGs and a set of CCES. The amount of resource in REs/REGs/CCEs used, or assumed to be used, for transmission of a DCI message can be understood to correspond to the "size" of a candidate.

The relationship between aggregation level, size and number of PDCCH candidates is given in the following Table, taken from 3GPP TS36.213 section 9.1.1.

TABLE 9.1.1-1

PDCCH candidates monitored by a UE.

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

It may be helpful to quote from the PDCCH Assignment Procedure as set out in 3GPP TS36.213, section 9.21.1 as follows:—

"The control region of each serving cell consists of a set of CCEs, numbered from 0 to $N_{CCE,k}-1$ according to Section 6.8.1 in [3], where $N_{CCE,k}$ is the total number of CCEs in the control region of subframe k. The UE shall monitor a set of PDCCH candidates on one or more activated serving cells as configured by higher layer signalling for control information in every non-DRX subframe, where monitoring implies attempting to decode each of the PDCCHs in the set according to all the monitored DCI formats.

The set of PDCCH candidates to monitor are defined in terms of search spaces, where a search space $S_k^{(L)}$ at aggregation level $L \in \{1, 2, 4, 8\}$ is defined by a set of PDCCH candidates. For each serving cell on which PDCCH is monitored, the CCEs corresponding to PDCCH candidate m of the search space $S_k^{(L)}$ are given by:—

$$L\{(Y_k+m') \bmod \lfloor N_{CCE,k}/L \rfloor\}+i \qquad \text{Expression 2.1}$$

where i=0, . . . , L−1.

For the common search spaces, $Y_k$ is set to 0 for the two aggregation levels L=4 and L=8.

For the UE-specific search space $S_k^{(L)}$ at aggregation level L, the variable $Y_k$ is defined by:—

$$Y_k = (A \cdot Y_{k-1}) \bmod D \qquad \text{Expression 2.2}$$

where $Y_{-1}=n_{RNTI} \neq 0$, A=39827, D=65537 and k=$\lfloor n_s/2 \rfloor$, $n_s$ is the slot number within a radio frame. The RNTI value used for $n_{RNTI}$ is defined in section 7.1 in downlink and section 8 in uplink.

For the common search space m'=m. For the UE specific search space, for the serving cell on which PDCCH is monitored, if the monitoring UE is configured with carrier indicator field then m'=m+$M^{(L)} \cdot n_{CI}$ where $n_{CI}$ is the carrier indicator field value, else if the monitoring UE is not configured with carrier indicator field then m'=m, where m=0, . . . , $M^{(L)}-1$. $M^{(L)}$ is the number of PDCCH candidates to monitor in the given search space."

As will be apparent, Expression 2.2 provides a pseudo-random function with a different result for each subframe k and for each UE (owing to the use of the UE's RNTI). Consequently Expression 2.1 yields a pseudo-random selection of a set of L successive CCE indices (incrementing by one each time), identifying the CCEs corresponding to the candidate locations.

To summarise, in any given subframe a DCI message for a given UE may be transmitted in one of several candidate locations which are determined pseudo-randomly. The algorithm for generating these candidate locations (or search space) gives different results for different UEs (based on the UE identity) and different subframes. For PDCCH, for simplicity the search space locations are generated using the same pseudo-random number as is used to generate the starting point (in terms of the first CCE which could be used) for the first candidate for different aggregation levels, but this typically results in the use of different CCEs per aggregation level. For a given aggregation level the search space consists of a set of adjacent locations for each successive candidate at least before any interleaving is applied. This scheme does have the advantage that UEs which may have the same search space locations (candidate locations) in one subframe will most likely have different locations in the next subframe, which removes the risk that these UEs would persistently block each other from using the PDCCH resources.

The same algorithm is expected to be used by both the network side (eNB) and the terminal. For a given subframe, the terminal calculates the set of candidate locations (resources) in which it should attempt reception of a DCI message (by blind decoding). This is the "search space" for a given UE. If the eNB wishes to send a DCI message to that UE in a particular subframe, the eNB will typically do the same calculation in order to determine In which locations it will be possible to transmit the DCI message and have it received by the UE (or at least where the UE will attempt reception). Both the eNB and UE are expected to perform the pseudo-random selection for all the candidates.

The eNB then chooses one of those candidate locations for the actual DCI message transmission. This is determined in dependence on which other UEs the eNB also wishes to send DCI messages to. Given that the set of candidate locations for each UE will typically be different, for any given UE some of the locations could also be the same as candidates for other UEs. Normally the eNB will only be able to transmit one DCI message in a given candidate location and consequently, once a given candidate location has been employed once by the eNB it is "used up" for that subframe. Therefore it is possible that while the total number of available locations could appear sufficient for the number of DCI messages to be sent in given subframe, overlaps in the search spaces between different UEs will reduce the number of possible DCI messages which could be sent, and "blocking" could occur.

If the set of candidates is small, and In a given subframe all those candidates for one UE are all "blocked" by DCI messages for other UEs, then the probability of blocking also occurring in the next subframe Is reduced if the sets of candidates are changed from subframe to subframe. This aspect Is likely to be more significant if there is a need to send more than one DCI message to a given UE in a subframe or UEs need to be sent multiple DCI message in successive subframes, or the UE-specific search space happens to overlap with the common search space (which is in a fixed location, and can be heavily loaded). Incidentally, the LTE specifications do not require that the eNB calculates all the candidate locations for a given UE, but this will be expected in a good implementation. It would be possible to reduce the blocking probability by increasing the amount of resource in which PDCCH can be transmitted (in other words to increase $N_{CCE,k}$ in expression 2.1); however, this would reduce the resources available to send data using PDSCH.

ePDCCH

A new control channel design (ePDCCH) is under discussion in 3GPP for LTE. This will transmit DCI messages in the same resources as currently reserved for downlink data (PDSCH). The ePDCCH will support a UESSS, but it is open whether a CSS will be specified for ePDCCH.

A possible motivation for using a CSS on ePDCCH is to reduce congestion on PDCCH, for example if there are more urgent DCI messages to be sent than can be accommodated within one subframe, then these could be sent on ePDCCH, and by using CSS any UE can be addressed.

ePDCCH may be transmitted in either a frequency-localized or a frequency-distributed manner depending on the requirements of the system. Localized transmission would be appropriate if the channel/interference properties are frequency selective, in which case it may be possible to transmit DCI messages in a favourable location in the frequency domain for a given UE. In other cases, for example if no frequency selective channel information is available at the eNB, distributed transmission (corresponding to the manner of transmission of PDCCH) would be appropriate.

The above explanation of PDCCH referred to the possibility of "blocking" between DCI messages intended for different UEs. For ePDCCH the eNB will also want to take into account knowledge of the channel conditions for differed parts of the spectrum in selecting which candidate location to use for a given UE. If the eNB wishes to use only "good" parts of the spectrum (for example high received SNR for that UE), the probability of blocking is likely to be increased since the number of suitable candidate locations will be reduced.

The design for distributed ePDCCH can be quite similar to PDCCH i.e. some resources are configured for distributed ePDCCH, the UE has a blind decoding search space within those resources, and a given DCI message will use a set of resource elements are spread across the frequency domain. By analogy with PDCCH, resources used for ePDCCH may be expressed in units of cCCE (corresponding to CCE) and eREG (corresponding to REG). These units eCCE and eREG may, but need not, have the same size in terms of REs or may differ in terms of mapping to physical resources. It is assumed, however, that 4 eCCEs will fit in one PRB pair. For localised ePDCCH the exact size of an eCCE or eREG is not of major importance for the purpose of describing certain embodiments.

More details and current assumptions in 3GPP on localized ePDCCH are as follows:—
  A DCI message consists of 1, 2, 4 or 8 eCCEs. This could be defined in terms of eREGs (like for distributed ePDDCH), and 1 eCCE would then be equivalent to a number of eREGs (e.g. 4).
  Up to 4 eCCEs can be transmitted in one PRB pair More details and current assumptions in 3GPP on distributed ePDCCH are as follows:—
  A PRB pair is divided in to a number of eREGs (e.g. 16)
  A DCI message consists of 4, 8, 16, or 32 eREGs. This could be equivalent to 1, 2, 4 or 8 eCCEs
  For frequency diversity the eREGs of a DCI message is are transmitted across multiple PRB pairs (e.g. 4 PRB pairs). Then a PRB pair could contain 1, 2, 4 or 8 eREGs from one DCI message Some of the particular design requirements for localised ePDCCH are:
  DCI messages can be transmitted in frequency domain locations with suitable channel and interference conditions for each terminal i.e. there are candidate locations in across the frequency domain
  the terminal does not need to blind decode too many candidates (e.g. comparable with PDCCH)
  the resources occupied by control messages are used efficiently (i.e. it is desirable that DCI messages which do not occupy a whole PRB can be multiplexed together in the same PRB, rather than being placed in separate PRBs)
  the possibility of sharing resources with distributed ePDCCH (in other words sending DCI both in localised ePDCCH and distributed ePDCCH in the same subframe, at least in different PRB pairs)
  use of resources for ePDCCH should have minimal impact on PDSCH
  the probability is minimized of a control message for one terminal blocking transmission of a message to another terminal in the same resource
  the probability of persistent blocking from subframe to subframe should be minimized
  simple implementation for both network and terminals.

These requirements for localized ePDCCH are not so easy to satisfy. For example, current proposals so far in 3GPP RAN1 have not been very detailed and seem to assume that a single set of resources (in terms of PRBs) would be configured to apply for all the DCI message candidates at any aggregation levels. Certain embodiments herein proposes a search space design which allows these requirements to be met.

SUMMARY

According to a first aspect of certain embodiments, there is provided a wireless communication method in which a wireless network transmits a control channel message which is received by a terminal, the method comprising,
  on the network side:
    configuring a respective search space in the frequency domain separately for each of a first plurality of candidates for the control channel message;
    making a pseudo-random selection of a location within the respective search space so configured for at least one of the first plurality of candidates;

determining one of the first plurality of candidates to use for transmission of a control channel message, and transmitting a control channel message at the pseudo-randomly selected location for the candidate so determined; and on the terminal side:

blind decoding a control channel message corresponding to each of a second plurality of candidates by making a pseudo-random selection of a location within each of the respective search spaces corresponding to the pseudo-random selection made on the network side.

Here, the "first plurality of candidates" and "the second plurality of candidates" may be identical. Alternatively they may be non-identical, for example if the terminal is allowed only a limited number of blind decoding attempts which is fewer than the first plurality.

Preferably, the search space is different for each candidate. Thus, certain embodiments herein permit a different set of resources to be configured for each candidate.

The search spaces for each of the candidates may be configured such that the corresponding resources are adjacently located in the frequency domain. The "location" means a search space location.

An amount of resource used for transmission of a control channel message may have one of a plurality of sizes depending on an aggregation level, in which case the search space may be different for each aggregation level.

The configuring may be performed, for example, by providing the terminal with a bit map defining the search spaces.

The configuring may be performed independently for each terminal or group of terminals within a plurality of terminals served by the same cell. In this case each of the search spaces may be different for each of the plurality of terminals or groups of terminals. However, some overlap between the search spaces is also possible.

Configuring the search spaces on a terminal/group basis allows the determining to be performed in accordance with channel conditions between the network and the terminal or group of terminals.

The configuring may also configure overlapping search spaces for a plurality of terminals and/or for a plurality of aggregation levels, each aggregation level representing a size of a resource used for transmission of a control channel message.

Any method of certain embodiments may be applied to an LTE-based wireless communication system in which resources are provided within subframes, and control channel messages (DCI) may be provided in each subframe. More particularly the method may be applied to an enhanced Physical Downlink Control Channel, ePDCCH wherein each of the control channel messages occupies one or more enhanced Control Channel Elements, eCCEs.

Certain embodiments are applicable both to localised ePDCCH and distributed ePDCCH. When applied to localised ePDCCH, the configuring may configure the search spaces to overlap with a search space configured for a distributed ePDCCH. More precisely, the resources corresponding to the search spaces configured for localised ePDCCH may be made to overlap with the resources corresponding to the search space configured for distributed ePDCCH.

Certain embodiments can be implemented either on the basis of the above mentioned eCCEs, or on the basis of pairs of Physical Resource Blocks, PRBs to which the eCCEs are mapped. In addition the method can be implemented on the basis of resources defined in terms of eREGs, instead of eCCEs.

In the former case, each search space comprises a set of eCCEs and the pseudo-random selection selects one or more eCCEs from the set. In the latter case, the resources corresponding to each search space may comprise a set of PRB pairs and the pseudo-random selection may comprise selecting a PRB pair from the set. Depending on the aggregation level in use, the pseudo-random selection may further select an eCCE within a PRB pair.

In one embodiment applied to ePDCCH in LTE, the pseudo-random selection is made based on the following formula:

$$L\{((Y_k+O'_{k,m,L}) \bmod |N'_{eCCE,k,m,L}/L|+O_{k,m,L}) \bmod |N_{eCCE,k}/L|\}+i$$

where L is the aggregation level, m is the candidate, k is a subframe for transmission of the control channel message, $N_{eCCE,\ k}$ is the total number of eCCEs available in subframe k, $N'_{eCCE,\ k,m,L}$ is the number of eCCEs within which a given candidate may be located, $O_{k,m,L}$ is an offset within the total number of eCCEs or a subset of eCCEs for a given subframe, candidate and aggregation level, $O'_{k,m,L}$ is an offset within the subset of eCCEs defined for a given subframe, candidate and aggregation level, $Y_k$ is a pseudo-random factor based on subframe k and a radio network temporary identifier, and i=0 . . . , L−1.

It should be noted that the above formula is a generic expression of a formula used to generate a set of eCCEs. Not all terms in the above formula nee be used in every case: for example the offsets are optional.

According to a second aspect herein, there is provided a wireless communication system comprising a base station and a terminal, the base station arranged to transmit a control channel message which is received by the terminal, the base station comprising:

a configurer for configuring a respective search space in the frequency domain separately for each of a plurality of candidates for the control channel message;

a selector for making a pseudo-random selection of a search space location within the respective search space so configured for at least one of the plurality of candidates;

a scheduler for determining one of the plurality of candidates to use for transmission of a control channel message, and a transmitter for transmitting a control channel message at the location selected by the selector for the candidate determined by the determining means; and the terminal comprising:

a receiver for receiving a search space configuration from the base station and for receiving the control channel message;

a selector for making a pseudo-random selection, corresponding to the selection made by the selector of the base station, of a location within the search space configured for at least one of the plurality of candidates; and a decoder for blind decoding a control channel message at the or each location selected by the selector of the terminal.

According to a third aspect herein, there is provided a base station for use in a wireless communication system and arranged to transmit a control channel message, the base station comprising:

a configurer for configuring a respective search space in the frequency domain separately for each of a plurality of candidates for the control channel message;

a selector for making a pseudo-random selection of a location within the respective search space so configured for at least one of the plurality of candidates;

a scheduler for determining one of the plurality of candidates to use for transmission of a control channel message, and a transmitter for transmitting a control channel message at the location selected by the selector for the candidate determined by the determining means.

According to a fourth aspect herein, there is provided a terminal for use in a wireless communication network, the network arranged to transmit at least one control channel message to the terminal, each control channel message based on one of a plurality of candidates, a respective search space in the frequency domain being configured separately for each of the candidates, wherein the terminal comprises:

a receiver for receiving a search space configuration for each of said candidates from the network, and for receiving the control channel message;

a selector for making a pseudo-random selection, corresponding to a pseudo-random selection made by the network, of a location within the search space configured for at least one of the plurality of candidates; and a decoder for decoding a control channel message at the or each location selected by the selector.

Further aspects of certain embodiments may provide a RRM entity in a wireless communication network for configuring base station equipment and terminals for performing any of the methods as defined above, and software for allowing transceiver equipment equipped with a processor to provide base station equipment or a terminal as defined above. Such software may be recorded on a computer-readable medium.

Some embodiments herein may provide a method for configuring a search space within which a mobile terminal performs blind decoding attempts for potential control message candidates which may be transmitted by a base station. The frequency domain resource for which the terminal performs a blind decoding attempt for a given candidate message is determined by a pseudo-random selection (known by both terminal and network) from a pre-determined set of possible resources. A difference from prior art is that pre-determined set of resources can be different for each candidate. In a preferred embodiment the set of resources is configured by the network for each terminal and each candidate.

An advantage of certain embodiments, when applied to ePDCCH in LTE, is that when serving multiple terminals the network can choose sets of resources for each terminal such that a good balance between conflicting requirements can be achieved: control message can be transmitted in frequency domain locations with suitable channel and interference conditions for each terminal; the terminal does not need to blind decode too many candidates; the resources occupied by control messages are used efficiently; the probability is minimized of a control message for one terminal blocking transmission of a message to another terminal in the same resource. The method also allows simple implementation for both network and terminals.

In general, and unless there is a clear intention to the contrary, features described with respect to one aspect herein may be applied equally and in any combination to any other aspect, even if such a combination is not explicitly mentioned or described herein.

As is evident from the foregoing, certain embodiments involve signal transmissions between a network and terminals in a wireless communication system. In a wireless communication system, typically, wireless access to the network is provided by one or more base stations or access points. Such a base station may take any form suitable for transmitting and receiving such signals. It is envisaged that the base stations will typically take the form proposed for implementation in the 3GPP LTE and 3GPP LTE-A groups of standards, and may therefore be described as an eNB (eNB) (which term also embraces Home eNB or HeNB) as appropriate in different situations. However, subject to the functional requirements of certain embodiments, some or all base stations may take any other form suitable for transmitting and receiving signals from user equipments.

Similarly, in certain embodiments, each terminal may take any form suitable for transmitting and receiving signals from base stations. For example, the terminal may be referred to as a subscriber station (SS), or user equipment (UE), and may take any suitable fixed-position or movable form. For the purpose of visualising, it may be convenient to imagine the terminal as a mobile handset (and in many instances at least some of the user equipments will comprise mobile handsets), however no limitation whatsoever is to be implied from this. In particular the terminals may be Machine-Type Communication, MTC devices. In the detailed description which follows, in which embodiments are described with respect to LTE, the terminal is referred to as a UE in accordance with usual LTE terminology.

BRIEF DESCRIPTION OF THE DRAWINGS

Reference is made, by way of example only, to the accompanying drawings in which:

FIG. 8 is a schematic illustration of functional blocks of a base station in certain embodiments; and.

DETAILED DESCRIPTION

Figure 1:
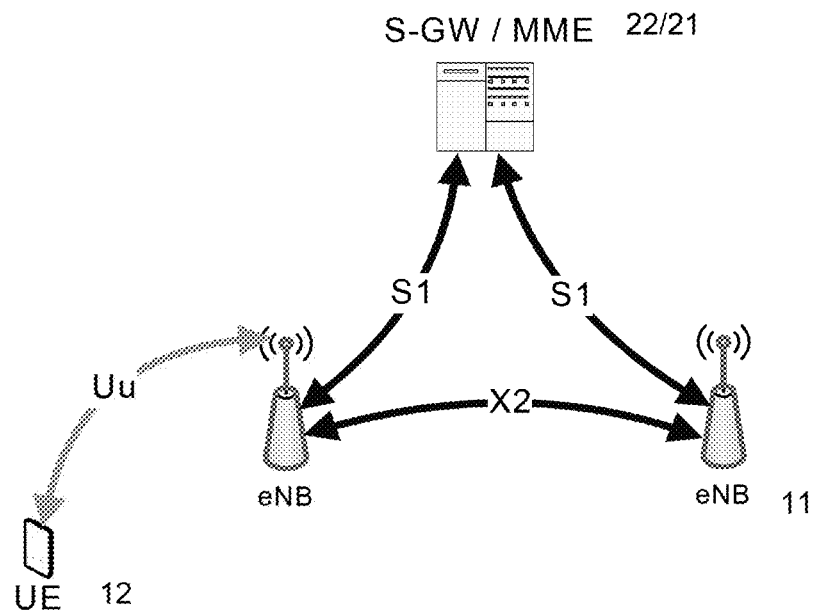
FIG. 1 schematically illustrates a basic LTE network topology.
Figure 2:
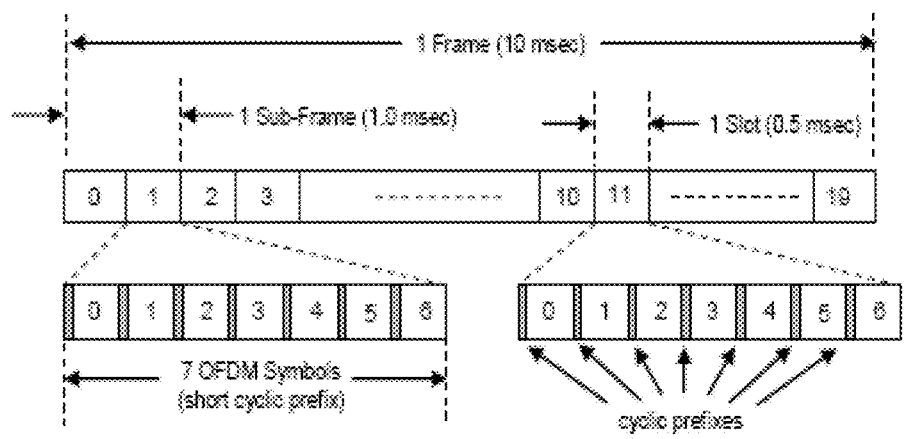
FIG. 2 illustrates a generic frame structure employed for the downlink in an LTE wireless communication system.
Figure 3:
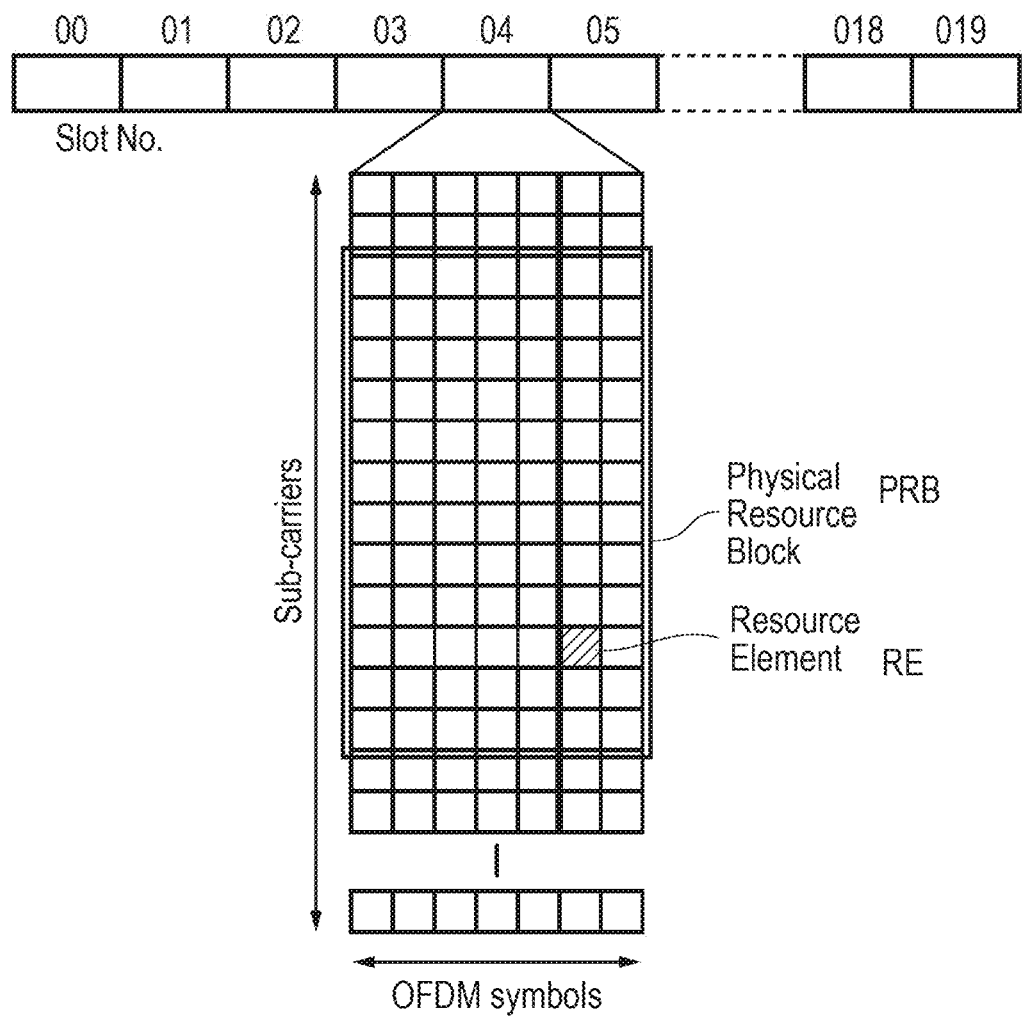
FIG. 3 illustrates units of resource allocation within a subframe.
Figure 4:
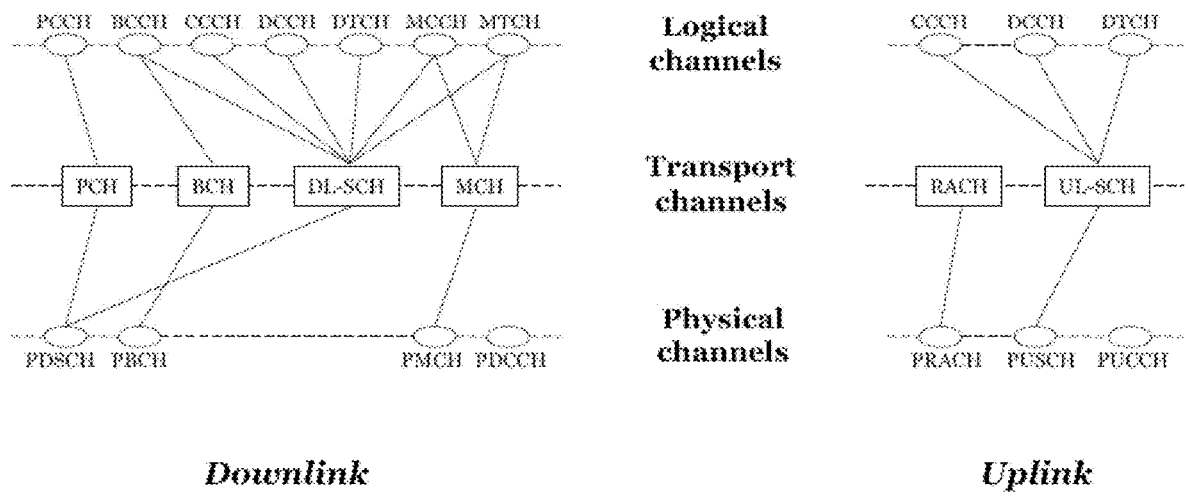
FIG. 4 shows relationships between various channels defined in LTE.
Figure 5:
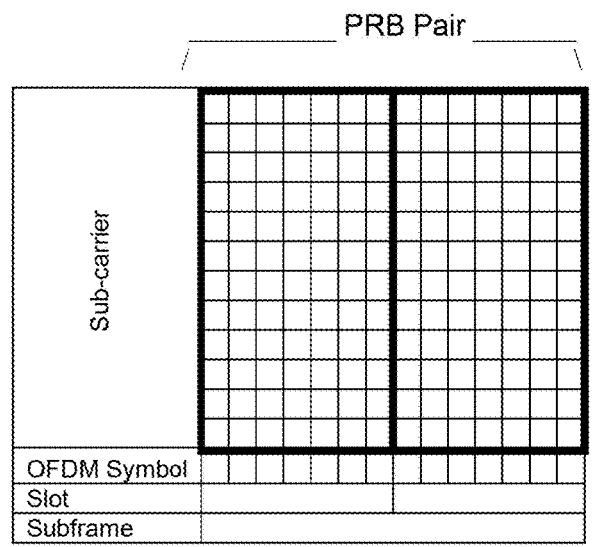
FIG. 5 illustrates a PRB pair.

Before describing embodiments, the concept of a "PRB Pair" will be explained with reference to FIG. 5. A single PRB was shown in FIG. 3. As shown in FIG. 5, a PRB pair is formed by two adjacent PRBs in the time domain, which occupy the same space in the frequency domain. As already mentioned each PRB occupies one slot and a subframe has a duration of two slots. Thus, each subframe allows transmission of one PRB pair in each of the available frequency locations, a single such PRB pair being shown in the Figure.

Certain embodiments use such PRB pairs to configure the search space for ePDCCH.

That is, a main feature of certain embodiments, as applied to localized transmission of ePDCCH in LTE, is that the frequency domain resource (PRB pair, and possibly eCCE within a PRB pair) for which the terminal performs a blind decoding attempt for a given DCI message candidate (below, simply referred to as "candidate") is determined by a pseudo-random selection (the same result being computable by both terminal and network, in similar fashion to the prior art) from a pre-determined set of PRB pairs.

Figure 6:
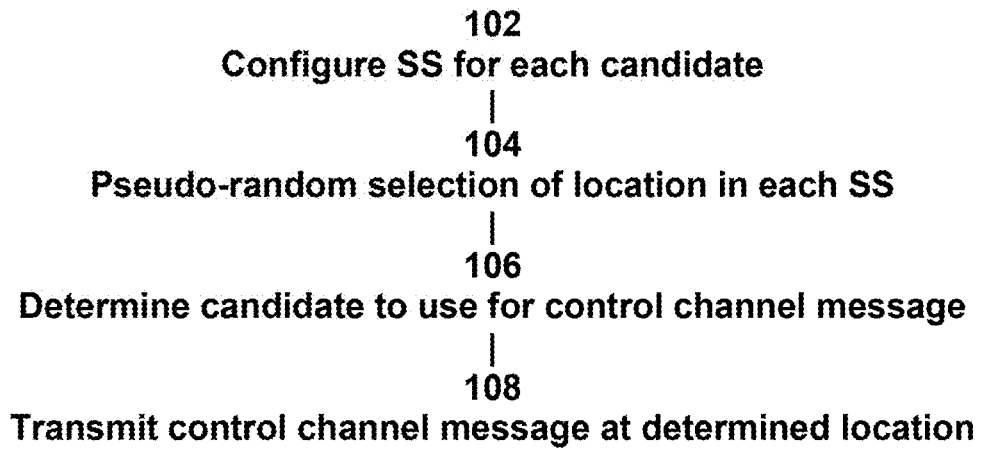
FIG. 6 is a flowchart of operations on the network side in certain embodiments.

FIG. 6 outlines a method from the network perspective. The steps shown here will normally be performed by a base station (eNB) providing one or more cells, perhaps with assistance from one or more higher-level entities in the network.

First (102), the network configures a search space for each candidate as explained below. This configuration will typically be applied to the terminals (UEs) served by a given cell (either individually or on a group basis as explained later) and communicated to those terminals. The configuration may be performed periodically, for example as UEs join or leave a cell, but will generally persist from one subframe to the next, unlike the DCI messages which will generally differ in each subframe.

In a step 104, for a given subframe and prior to constructing ePDCCH for transmission to a given UE or group of UEs, the base station performs a pseudo-random selection within each of the search spaces configured in step 102, by calculation using one of various formulae stated below. In a similar manner to that already described for PDCCH, the pseudo-random selection involves the subframe number k as a parameter so as to yield different results for each subframe.

This pseudo-random selection selects a specific location for each candidate. However, only one candidate will (typically) be used for transmission to the UE/group of UEs. Step 106 is to determine which of the candidates to adopt for the actual transmission of the DCI message in the given subframe. This can be done in any desired manner, for example "first come first served", or (where there are several DCI messages to be sent to individual UEs) by the scheduler attempting to find a set of locations such that as many of the DCI messages as possible can be sent in the subframe, for example by brute-force search of all the possible combinations.

Having determined one candidate location to be used for transmission, the base station transmits the DCI message to the UE(s) concerned.

Figure 7:
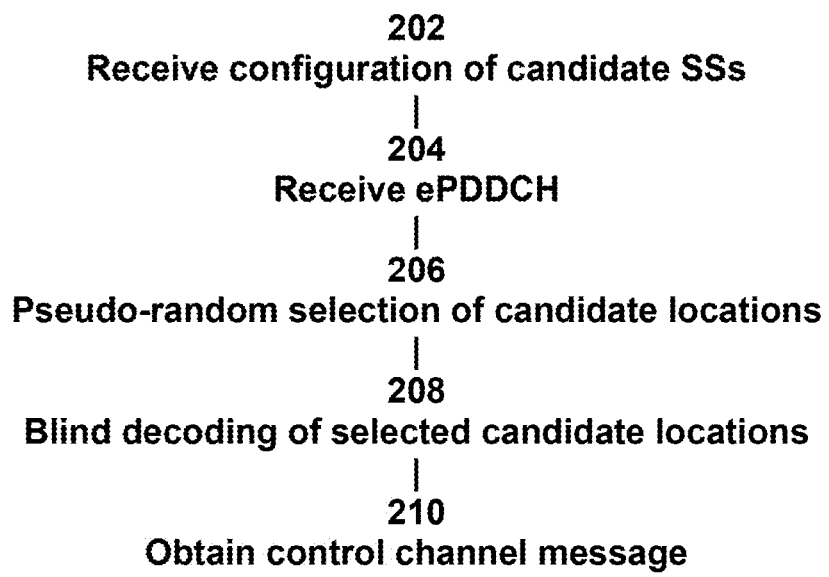
FIG. 7 is a flowchart of operations on the terminal side in certain embodiments.

FIG. 7 outlines the procedure from the standpoint of the terminal (UE). At a step 202, the terminal receives the search spaces configured in FIG. 6, 102 for each candidate. As already mentioned this may be a specific configuration for that UE, or may apply collectively to a group of UEs. At some later point during operation of the network, the UE receives ePDCCH for in a given subframe. In 206 the terminal calculates a pseudo-random selection corresponding to that employed by the network in FIG. 6, 104. (The UE need not wait for receipt of ePDCCH to make this calculation). This limits the locations which the UE needs to search for the DCI message; however, the UE does not know which candidate location has actually been chosen for transmission, nor its aggregation level (size). In step 208, the UE performs blind decoding of the candidate locations found by the pseudo-random selection, for each aggregation level. In step 210, the DCI is obtained and acted upon.

Figure 8:
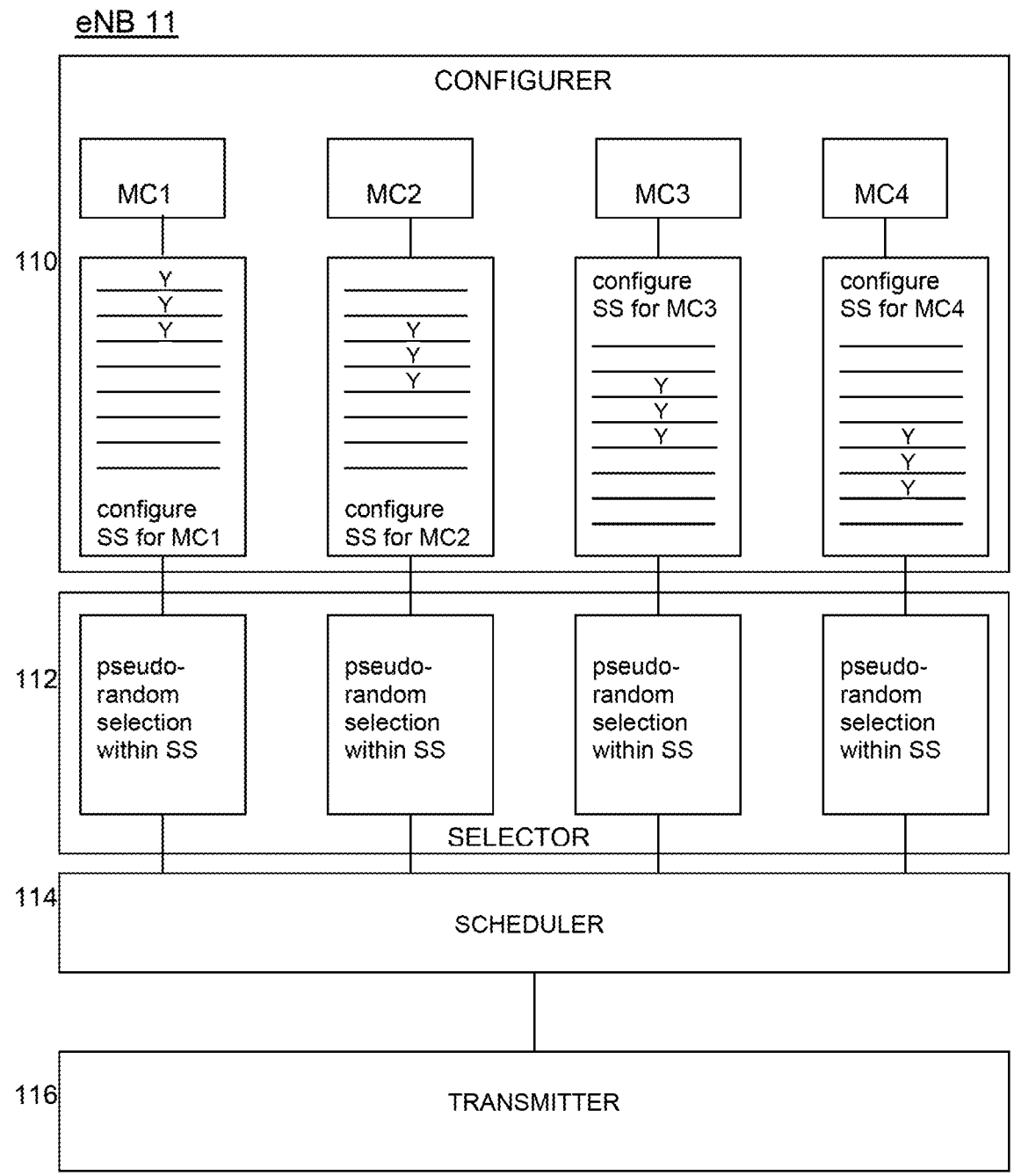

FIG. 8 shows schematically the functional blocks in an eNB 11 for performing the operations outlined in FIG. 6.

The eNB is equipped with a configurer 110 which, for each candidate MC1-MC4, configures the search space (SS). The available resources are schematically shown by a series of horizontal lines each representing for example a PRB pair (FIG. 5), the vertical direction representing the frequency domain. For each candidate, some of the available resources are marked Y (for "Yes") indicating inclusion in the search space for that candidate. Configuration of the search spaces may be made in various ways as explained in more detail below.

A selector 112 provides the above mentioned pseudo-random selection in respect of each candidate. As shown here the pseudo-random selection is performed for every candidate and prior to determining which candidate is actually used for transmission; however this is not essential. That is, it might not always be necessary to perform the pseudo-random selection for every candidate.

A scheduler 114 provides the above-mentioned operation of determining which candidate to employ in the subframe concerned for transmission of DCI, as part of its wider task of constructing the whole downlink transmission for the subframe.

A transmitter 118 transmits the downlink transmission scheduled by the scheduler 116, including the DCI message using the determined candidate whose location was pseudo-randomly selected within the appropriate search space for that candidate and terminal.

Figure 9:
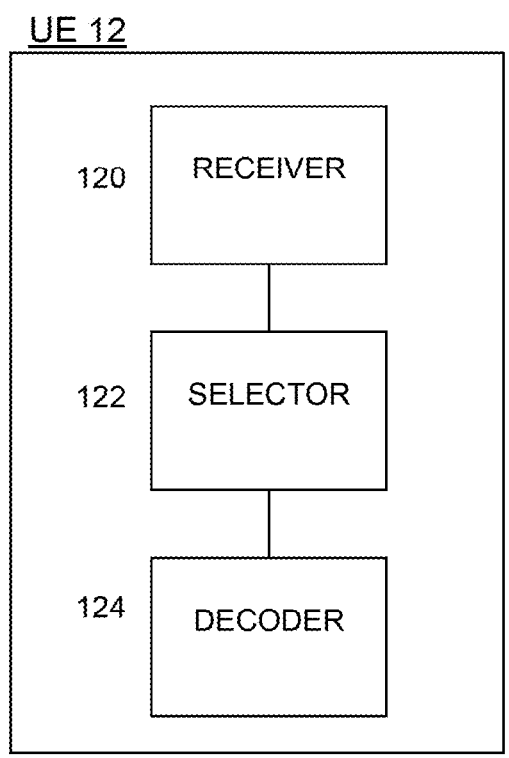
FIG. 9 is a schematic illustration of functional blocks of a terminal in certain embodiments.

FIG. 9 shows the relevant functional blocks of a UE 12 for performing the operations outlined in FIG. 7. A receiver 120 receives first, the configuration of the search spaces in use for that UE and, for each subframe, a downlink transmission including DCI at some location within the search space. A selector 122 calculates a pseudo-random selection within the search space in the same way as selector 112 in the eNB, which is possible since both eNB and UE know the parameters used as the basis of the calculation. The selector 122 having found the location of each candidate, the decoder 124 only has to blind-decode at (and possibly within) the selected locations to obtain the transmitted DCI. In decoding the eCCEs and finding that the CRC check is positive, the decoder assumes that there is a DCI message present in those eCCEs. There is a direct mapping between eCCEs and PRB pairs so if the eCCEs are known, so is the PRB pair.

In a preferred embodiment, the set of PRB pairs is configured by the network independently for each UE and each DCI message candidate. However, the PRB pairs for different UEs may overlap; indeed, since only a limited number of distinct PRB pairs are available some overlap may be inevitable where a cell serves many UEs. Since there will typically be multiple eCCEs within a PRB pair, there are multiple possible locations for a DCI message and thus multiple candidate locations to search.

In this arrangement, therefore, the "search space" becomes the set of candidate locations for DCI messages within the set of PRB pairs, which could be some or all of the possible locations.

For a given UE the set of PRB pairs from which the pseudo-random selection is made can be different for each DCI message candidate. This means for example, that the set of PRB pairs for different DCI message candidates can be placed in different parts of the system bandwidth. This allows frequency domain scheduling of the ePDCCH transmission by selection of the candidate location with advantageous channel and interference characteristics.

The set of PRB pairs for different aggregation levels and/or different UEs may be made different to minimize the blocking probability (i.e. reduces the competition between UEs for resources in which to transmit ePDCCHs). Or where a DCI message would only occupy part of a PRB pair, the set of PRB pairs for different aggregation levels could be made the same in order to increase the probability that resources allocated for ePDCCH are used efficiently (i.e. fully occupied). Thus, there is a compromise to be reached between providing search spaces spanning many PRB pairs (to minimise blocking) and smaller search spaces in just a few PRB pairs (to maximise multiplexing efficiency).

Again, where a DCI message would only occupy part of a PRB pair, the set of PRB pairs for localized ePDCCH could be made to overlap with PRB pairs configured for distributed ePDCCH in order to increase the probability that resources allocated for ePDCCH are used efficiently.

In the above description the "resource" is described in terms of PRB pairs (often shorten to just "PRB"). However, certain embodiments can equally be applied if the resource is defined in other ways, such as referring directly to eCCEs or eREGs. In certain embodiments, once the basic set of resources is defined on the basis of PRB pairs, the candidates are further defined using eCCEs.

Some specific embodiments will now be described employing the above principles.

In embodiments below based on LTE, the network operates using FDD and comprises one or more eNBs, each controlling at least one downlink cell, each downlink cell having a corresponding uplink cell. Each DL cell may serve one or more terminals (UEs) which may receive and decode signals transmitted in that cell.

In order to schedule the appropriate use of transmission resources in time, frequency and spatial domains for transmission to and from the UEs, the eNBs send control channel messages (PDCCH) to the UEs. A DCI message carried on PDCCH typically indicates whether the data transmission will be in the uplink (using PUSCH) or downlink (using PDSCH), it also indicates the transmission resources, and other information such as transmission mode and data rate. As determined by higher layers, the UE physical layer typically performs blind decoding for a number of possible PDCCH message types (DCI formats) over defined search spaces (CSS and UESSS) on the downlink primary cell (Pcell).

In certain embodiments we typically assume that the UE is configured by the network to monitor the UESSS on a new control channel (ePDCCH) for DCI messages (maybe instead or in addition to monitoring legacy PDCCH). The counterparts of CCE and REG on the new ePDCCH are denoted eCCE and eREG. The configuration relating to ePDCCH may be via higher layer signalling (for example RRC in LTE). The configuration may define one or more of the following:—

The specific RNTI or RNTIs which may be used for scrambling the CRC of the DCI message The DCI formats which may be used The aggregation levels which may be used for each DCI format The number of blind decoding attempts (i.e. DCI message candidates) for each aggregation level/DCI format (it will be noted that a single pseudo-random selection can be used to define multiple blind decoding attempts)

and of particular importance for certain embodiments:—

A set of resources from which a resource is selected for each DCI message candidate.

A resource might be defined by one or more of PRB(s) eCCE(s), eREG(s).

Following the above mentioned Expressions 2.1 and 2.2 for PDCCH as stated in 3GPP TS 36.213, the pseudo-random selection of eCCE(s) for a DCI message candidate m may be given by:—

$$L\{(Y_k+m) \bmod \lfloor N_{eCCE,k}/L \rfloor\}+i \qquad \text{Expression 3.1}$$

$$Y_k=(A \cdot Y_{k-1}) \bmod D \qquad \text{Expression 3.2}$$

Thus, $Y_k$ is a pseudo-random variable in the same way as employed in PDCCH. These expressions are used to find the eCCEs for a given DCI message candidate within the whole set of eCCEs, and the whole set of eCCEs can be mapped to a set of PRB pairs.

This method may be adapted for different embodiments. That is, the Expression used may be made more or less generic as required by the level of flexibility needed.

Note that according to Expression 3.1, candidates corresponding to successive values of m occupy adjacent eCCEs. Also there is probably no advantage in the value of $N_{eCCE,k}$ being different in different subframes, so it may be possible to drop the subscript k. Although the above Expression considers eCCEs by analogy with the Expression already defined for PDCCH, the mapping of eCCEs to PRB pairs (or possibly eREGs) is determined by other means. For example the set of PRB pairs may be configured for a given candidate, and then Expressions 3.1 and 3.2 applied to the eCCEs within those PRB pairs. Alternatively it would be possible to express the Expressions in terms of PRB pairs.

For convenience in discussion we consider a basic scenario with 4 DCI message candidates, each occupying one PRB pair (i.e. aggregation level L=4), with a system bandwidth of 12 PRB pairs. This case is simple to describe since the eCCEs forming the DCI message occupy one PRB pair and can be assumed to map to a single PRB pair. This means that the pseudo-random variable $Y_k$ leads to a particular PRB pair, and allows the description to refer to PRB pairs without mentioning eCCEs. It will be understood however that more generally, a DCI message may have a starting point at a specific eCCE within a PRB Pair. For L=1 or 2, Expression 3.1 yields the starting point within a PRB pair. On the other hand with L=8 the starting points would fall on every other PRB pair.

First Embodiment

In a first embodiment the network configures the set of PRB pairs for each of the 4 DCI message candidates. One example is given in Table 1(a), in which the column "PRB Pair" denotes a numerical index identifying each of 12 pairs of PRBs, numbered in order of frequency (whether lowest- or highest-first is unimportant).

TABLE 1(a)

| | Independent configuration of DCI message candidates, equal without overlap | | | |
|---|---|---|---|---|
| PRB Pair | Set for DCI message candidate 1 | Set for DCI message candidate 2 | Set for DCI message candidate 3 | Set for DCI message candidate 4 |
| 1 | Y | | | |
| 2 | Y | | | |
| 3 | Y | | | |
| 4 | | Y | | |
| 5 | | Y | | |
| 6 | | Y | | |
| 7 | | | Y | |
| 8 | | | Y | |
| 9 | | | Y | |
| 10 | | | | Y |
| 11 | | | | Y |
| 12 | | | | Y |

Then for each candidate a pseudo-random selection is made. As an example, this could lead to the following PRB pairs being selected for each DCI message candidate respectively: 1, 4, 8, 11, or perhaps: 2, 4, 7, 12. If the channel conditions vary slowly with PRB, using one of these would allow the DCI message to be transmitted in a PRB pair close to the best one.

Another configuration is shown in Table 1(b), where the number of PRBs in each set is larger, and overlapping. This may not give any specific advantage.

TABLE 1(b)

Independent configuration of DCI message candidates, unequal, with overlap

| PRB Pair | Set for DCI message candidate 1 | Set for DCI message candidate 2 | Set for DCI message candidate 3 | Set for DCI message candidate 4 |
|---|---|---|---|---|
| 1 | Y | | | |
| 2 | Y | | | |
| 3 | Y | | | |
| 4 | Y | | | |
| 5 | Y | Y | | |
| 6 | | Y | | |
| 7 | | Y | Y | |
| 8 | | | Y | Y |
| 9 | | | Y | Y |
| 10 | | | | Y |
| 11 | | | | Y |
| 12 | | | | Y |

The configuration of the PRB sets could be provided individually to each UE, in which case each UE could have a different configuration, or the same configuration could be broadcast to multiple UEs. The configurations could be provided in the form of bit maps.

As a variation each DCI message occupies two PRB pairs (i.e. aggregation level 8). In this case the location of DCI messages may be limited to start with an odd-numbered PRB pair. In other words, the "Set for DCI message candidate 1" would include all of PRB Pair 1&2, 3&4 and 5&6. Incidentally, it is intentional for the search spaces of candidates 2-4 to have fewer PRB pairs allocated.

TABLE 1(c)

Independent configuration of DCI message candidates, two PRB pairs per DCI message

| PRB Pair | Set for DCI message candidate 1 | Set for DCI message candidate 2 | Set for DCI message candidate 3 | Set for DCI message candidate 4 |
|---|---|---|---|---|
| 1 | Y | | | |
| 2 | | | | |
| 3 | Y | | | |
| 4 | | | | |
| 5 | Y | Y | | |
| 6 | | | | |
| 7 | | Y | Y | |
| 8 | | | | |
| 9 | | | Y | Y |
| 10 | | | | |
| 11 | | | | Y |
| 12 | | | | |

In the first embodiment, different configurations could be applied for different aggregation levels, or the same configuration could apply for more than one aggregation level (for example all aggregation levels), although this may lead to more blocking.

In a variation, each DCI message occupies less than one PRB pair. For example, up to 4 DCI messages of 1 eCCE in one PRB pair (i.e. aggregation level 1).

Several further variations are possible. For example, as a preferred option, the particular eCCE within a PRB pair (starting point) could also be part of the pseudo-random selection. Alternatively the starting eCCE could be fixed by specification (for example depending in UE identity), or semi-statically configured for the UE. In this case Expression 3.1 would be modified to refer to PRBs rather than eCCEs.

In order to efficiently support the possibility of two allocations in the same part of the spectrum (for example two DCI messages sent to the same UE for UL and DL assignments in the same subframe), the selected candidate could be associated with additional candidates in a small search space, such as a set of adjacent eCCEs (modulo the number of eCCEs per PRB pair). This idea could be extended to cover the case where the selected candidate is also associated with candidates in a small number of adjacent PRB pairs.

A configuration like that shown in Table 2 could be used.

TABLE 2

Independent configuration of DCI message candidates, Allocation for low aggregation levels.

| PRB Pair | Set for DCI message candidate 1 | Set for DCI message candidate 2 | Set for DCI message candidate 3 | Set for DCI message candidate 4 |
|---|---|---|---|---|
| 1 | Y | | | |
| 2 | | | | |
| 3 | | | | |
| 4 | | Y | | |
| 5 | | | | |
| 6 | | | | |
| 7 | | | | |
| 8 | | | Y | |
| 9 | | | | |
| 10 | | | | |
| 11 | | | | |
| 12 | | | | Y |

If multiple UEs were given the same configuration this would be likely to increase the probability that resources with PRB pairs containing ePDCCH would be fully utilised, or could allow different PRB pairs to be used for distributed transmission.

This embodiment would be suitable if the ePDCCH resources are to be shared between localised and distributed transmission. The configuration(s) for localised transmission of DCIs with low aggregation levels could be aligned with configuration(s) for distributed transmission. This could be beneficial for resource efficiency with low aggregation levels (1 or 2) for localized transmission, but may not be helpful for higher aggregation levels (4 or 8), since complete PRB pairs would be used anyway.

The configuration could be indicated in the form of a bit map of PRB pairs, where a particular eCCE within a PRB pair is determined by the pseudo random selection process. Alternatively the bit map could also indicate the eCCEs within PRB pairs. This would be more flexible, although the size of the bit map would be significantly larger.

According to this embodiment the eCCEs can be in different set of resources for each candidate and/or aggregation level, so as an example, Expression 3.1 can be modified as follows:

$$L\{(Y_k+m) \bmod \lfloor N_{eCCE,k,m,L}/L \rfloor\}+i \quad \text{Expression 3.3}$$

Here each instance $N_{eCCE,k,m,L}$ may refer to different resources and can now depend on the candidate m and/or L. The "mod" operation is to ensure that the resource location computed using $(Y_k+m)$ lies within the defined set of eCCEs for that candidate/aggregation level. The eCCEs within a resource may still depend on m, which means that this formulation would be OK for the case where the same resources are configured to be the same for multiple candidates.

A more general formulation is given by the following Expression 3.4:

$$L\{(Y_k+O_{m,L})\bmod \lfloor N_{eCCE,k,m,L}/L\rfloor\}+i \quad \text{Expression 3.4}$$

Where $O_{m,L}$ is an offset that depends on m and/or L. This could be a fixed offset for each (m,L) or could be configured. Note that in the current LTE Rel 10 specifications, $O_{m,L}=m$. Setting $O_{m+1,L}=O_{m,L}+1$ would mean that successive candidates are located in adjacent eCCEs (like currently in PDCCH for aggregation level 1).

In some variations each DCI message candidate is pseudo-randomly selected within a set of resources. This would require some modification to extend the pseudo-random sequence beyond that required for 10 subframes, such as:

$$L\{(Y_{k+10m})\bmod \lfloor N_{eCCE,k,m,L}/L\rfloor\}+i \quad \text{Expression 3.5}$$

Second Embodiment

A second embodiment is based on the first embodiment, but the configuration is done by indicating the DCI message candidate set a given PRB pair belongs to. (Here, "DCI message candidate set" expresses the same information as each "Set for DCI message candidates" in the earlier Tables, but in a more compact form).

TABLE 2(a)

Configuration of candidates per PRB pair.

| PRB Pair | DCI message candidate set |
|---|---|
| 1 | 1 |
| 2 | 1 |
| 3 | 1 |
| 4 | 2 |
| 5 | 2 |
| 6 | 2 |
| 7 | 3 |
| 8 | 3 |
| 9 | 3 |
| 10 | 4 |
| 11 | 4 |
| 12 | 4 |

The configuration signalling for this embodiment could be more efficient, but it would mean that the same PRB pair could not be used for more than one candidate in the list. There could be different lists per aggregation level.

Not all PRB pairs need to be assigned to a set, as shown in Table 3 (b). This could help with packing efficiency for DCI messages with aggregation levels 1 or 2, or could allow different PRB pairs to be used for distributed transmission.

TABLE 2(b)

Configuration of candidates per PRB pair, where some PRB pairs are not used for ePDCCH.

| PRB Pair | DCI message candidate set |
|---|---|
| 1 | 1 |
| 2 | 1 |
| 3 | |
| 4 | 2 |
| 5 | 2 |
| 6 | |
| 7 | 3 |
| 8 | 3 |
| 9 | |
| 10 | 4 |
| 11 | 4 |
| 12 | |

TABLE 2(c)

Configuration of candidates per PRB pair, avoiding part of the spectrum

| PRB Pair | DCI message candidate set |
|---|---|
| 1 | 1 |
| 2 | 1 |
| 3 | 2 |
| 4 | 2 |
| 5 | 3 |
| 6 | 3 |
| 7 | 4 |
| 8 | 4 |
| 9 | |
| 10 | |
| 11 | |
| 12 | |

Third Embodiment

A third embodiment is like the second embodiment except that the resources are defined in terms of eCCEs, and different sets of eCCEs may be allocated for different candidates.

In a particular variation this can be achieved with a single a set of resources (in terms of PRBS) is defined for ePDCCH, and applying different offsets for different candidates. As an example, this can be achieved by adapting Expression 3.1 as follows:

$$L\{(Y_k+O_{m,L})\bmod \lfloor N_{eCCE,k}/L\rfloor\}+i \quad \text{Expression 3.6}$$

Here:

$N_{eCCE,k}$ is the total number of eCCEs allocated for potential use of ePDCCH in subframe k $O_{m,L}$ defines the offset within the set of eCCEs of the subset of eCCEs for a given candidate and/or aggregation level. This depends on m and/or L. This would determine how the eCCEs useable for ePDCCH are distributed in the frequency domain. This could be a fixed offset for each (m,L) or could be configured Note that in the current LTE Rel 10 specifications, $O_{m,L}=m$. Setting a value of $O_{m,L}\approx mN_{eCCE,k}/M$ where M is the total number of candidates for a given aggregation level would mean that different candidates are located with roughly equal spacing within the total set of eCCEs, but the actual location of a given candidate is not constrained.

Setting $O_{m+1,L} = O_{m,L} + 1$ would mean that successive candidates are located in adjacent eCCEs (like currently in PDCCH for aggregation level 1).

A variation of this embodiment further defines a subset of the eCCEs defined for ePDCCH to be available per DCI message candidate and/or aggregation level. This would allow DCI messages with particular aggregation levels to be confined to particular parts of the spectrum. This can be achieved by modifying Expression 3.6 to constrain the location of a given candidate to lie within a given subset of eCCEs (plus an offset):

$$L\{(Y_k \bmod \lfloor N'_{eCCE,k,m,L}/L \rfloor + O_{m,L}) \bmod \lfloor N_{eCCE,k}/L \rfloor\} + i \quad \text{Expression 3.7}$$

Here:

$N'_{eCCE,k,m,L}$ defines the number of eCCEs in the subset of resources within which a given candidate for a given aggregation level can occur. How this value is configured for different UEs would determine the total amount of resource actually useable for ePDCCH.

The parameters $N_{eCCE,k}$, $O_{m,L}$ and $N'_{eCCE,k,m,L}$ may be fixed in specification or configured, and may be same or different per UE.

It is also possible to introduce an additional parameter $O'_{m,L}$ which defines an offset within the subset of resources defined for a given candidate and aggregation level, as shown in the following Expression 3.8:

$$L\{((Y_k + O'_{m,L}) \bmod \lfloor N'_{eCCE,k,m,L}/L \rfloor + O_{m,L}) \bmod \lfloor N_{eCCE,k}/L \rfloor\} + i \quad \text{Expression 3.8}$$

If multiple candidates of the same aggregation level are defined use the same subset of eCCEs, this would allow them to be given different eCCEs within that subset. As an example, one possibility is to set $O'_{m,L} = m'$, like for PDCCH. Further following PDCCH for carrier aggregation with cross carrier scheduling, it is possible to have $m' = m + M^{(L)} \cdot n_{CI}$ where $n_{CI}$ is the carrier indicator field value, or if there is only one candidate per carrier per subset of eCCEs, then $m' = m + n_{CI}$ would be sufficient. Considering the potential usefulness of $O'_{m,L}$, there may be no need to allow a dependency on L.

Even more generally, allowing the offsets to vary by subframe gives the following formula:

$$L\{((Y_k + O'_{k,m,L}) \bmod \lfloor N'_{eCCE,k,m,L}/L \rfloor + O_{k,m,L}) \bmod \lfloor N_{eCCE,k}/L \rfloor\} + i \quad \text{Expression 3.9}$$

The set of resources (e.g. PRBs) defined for ePDCCH could be fixed in specification (e.g. as the whole system bandwidth) or configured (for example as a bit map of PRBs or PRB groups, or a range of PRBs, or more than one range of PRBs). As an alternative the resources be defined as set of eCCEs, rather than PRBs.

If each DCI message candidate is pseudo-randomly selected within a subset of resources this would require some modification to extend the pseudo-random sequence beyond that required for 10 subframes such as:

$$L\{(Y_{k+10m} \bmod \lfloor N'_{eCCE,k,m,L}/L \rfloor + O_{m,L}) \bmod \lfloor N_{eCCE,k}/L \rfloor\} + i \quad \text{Expression 3.10}$$

Further variations include:
- the case where the set of PRBs for ePDCCH is the whole system bandwidth
- the parameters $N_{eCCE,k}$, $O_{m,L}$ and $N'_{eCCE,k,m,L}$ are the same for aggregation levels 1 and 2 (to allow efficient multiplexing in the same PRBs)
- the parameters $N_{eCCE,k}$, $O_{m,L}$ and $N'_{eCCE,k,m,L}$ are the same for aggregation levels 4 and 8, and at least one parameter is different to those for aggregation levels 1 and 2 (to avoid blocking of resources used for those aggregation levels)
- the resources for aggregation levels 4 and 8, are different to those for aggregation levels 1 and 2 (to avoid blocking of resources used for those aggregation levels)—this could be used to arrange that resources for aggregation levels 4 and 8 are non overlapping with (i.e., orthogonal to) those for aggregation levels 1 and 2.

Fourth Embodiment

The above embodiments are directed at localised ePDCCH, but a fourth embodiment is aimed at distributed transmission. The resources for candidates for distributed ePDCCH can be defined independently of those for localised ePDCCH.

Here, as an example, the PRB pairs available for distributed transmission may be indicated as shown in Table 4(a).

TABLE 4(a)

Configuration for distributed transmission

| PRB Pair | Available for distributed ePDCCH |
|---|---|
| 1 | Y |
| 2 | |
| 3 | |
| 4 | Y |
| 5 | |
| 6 | |
| 7 | Y |
| 8 | |
| 9 | |
| 10 | |
| 11 | |
| 12 | Y |

In this case it is convenient if the number of PRB pairs allocated is a multiple of the required diversity order (for example 4)

TABLE 4(b)

Configuration for distributed transmission, avoiding part of the spectrum

| PRB Pair | Available for distributed ePDCCH |
|---|---|
| 1 | Y |
| 2 | |
| 3 | Y |
| 4 | |
| 5 | Y |
| 6 | |
| 7 | Y |
| 8 | |
| 9 | |
| 10 | |
| 11 | |
| 12 | |

If more resources are required for distributed transmission, then multiple sets of resources (such as shown in Table 4(a)) could be configured. Alternatively more resource could be indicated.

TABLE 4(c)

Configuration for distributed transmission with additional resource

| PRB Pair | Available for distributed ePDCCH |
|---|---|
| 1 | Y |
| 2 | Y |
| 3 | |
| 4 | Y |
| 5 | Y |
| 6 | |
| 7 | Y |
| 8 | Y |
| 9 | |
| 10 | |
| 11 | Y |
| 12 | Y |

A further possibility is to configure the size and location of the first resource (PRB or eCCCE or eREG) and determine the remaining resources using one or more offset values, according to the diversity order.

Different configurations could be used per DCI message candidate and/or aggregation level. There should be no problem if candidate locations for localised ePDCCH and distributed ePDCCH overlap; however without appropriate design there might be a problem with simultaneously transmission of localised and distributed DCI messages in the same PRB pairs. In general, support for distributed ePDCCH would require further subdividing one PRB pairs beyond the 4 CCEs assumed earlier, so that a DCI message could be transmitted using a fraction of an eCCE in each of a number of PRB pairs.

A desirable feature in practice would be to use this embodiment for distributed transmission together with one of the others for localized transmission, such that the resources for localized transmission of ePDCCH with aggregation levels 1 and 2 overlapped with those for distributed transmission of ePDCCH.

As already mentioned, the resources to be used for ePDCCH may be expressed in terms of other units than eCCEs. In the case of distributed ePDCCH, one possible formula in terms of eREGS would be:

$$L_{eREG}\{((Y_k+m) \bmod |N'_{eREG,k,m,l}/L_{eREG}|+D_{k,m,L}) \bmod |N_{eREG,k}/L_{eREG}|\}+i \quad \text{Expression 3.11}$$

where i indicates the eREG within a candidate, $L_{eREG}$ is the aggregation level in terms of the number of eREGs comprising the DCI message, m is the candidate, $N_{eREG,k}$ is the total number of eREGs available for ePDCCH in subframe k, $D_{k,m,L}$ is an offset which depends on the candidate, and $N'_{eREG,k,m,l}$ is the number of eREGs within which a given candidate may be located.

However, this Expression will lead to a set of adjacent eREGs per candidate. To allow for the possibility of distributing the eREGs for one DCI message, this could be done as follows:

$$L_{eREG}\{((Y_k+m) \bmod |N'_{eREG,k,m,l}/(dL_{eREG})|+D_{k,m,L}) \bmod |N_{eREG,k}/(dL_{eREG})|\}+i+D'_{k,m,L} \quad \text{Expression 3.12}$$

Here, $D'_{k,m,L}$ is an additional offset which can place different eREGs in different parts of the frequency domain. and d is the diversity order. The factor $dL_{eREG}$ is also included, to ensure that the maximum number of available eREGs is not exceeded when frequency diversity is applied. To limit the number of PRB pairs occupied by distributed ePDCCH, it may be desirable to limit (or fix) the frequency diversity order, e.g. to four.

Fifth Embodiment

As already mentioned, certain embodiments allow frequency domain scheduling of the ePDCCH transmission by selection of the candidate location with the most advantageous channel and interference characteristics. In a fifth embodiment, the set of resources (PRB pairs) is partly or wholly determined by channel feedback from the UE. For example if CSI feedback indicates that a particular sub-band is preferred for downlink transmission, then this information can be used to determine the PR+B pairs for at least one the DCI message candidates.

Various modifications are possible within the scope of the present invention.

Any of the embodiments and variations mentioned above may be combined in the same system. The same eNB may operate in accordance with more than one of the embodiments simultaneously, and one UE may likewise operate in accordance with more than one of the embodiments simultaneously. Whilst the above description has been made with respect to LTE and LTE-A, certain embodiments may have application to other kinds of wireless communication system also. Accordingly, references in the claims to "user equipment" are intended to cover any kind of subscriber station, MTC device and the like and are not restricted to the UE of LTE.

In any of the aspects or embodiments described above, the various features may be implemented in hardware, or as software modules running on one or more processors. Features of one aspect may be applied to any of the other aspects. It will be understood that the functional blocks shown in the Figures do not necessarily correspond to discrete hardware units or circuits.

Certain embodiments also provides a computer program or a computer program product for carrying out any of the methods described herein, and a computer readable medium having stored thereon a program for carrying out any of the methods described herein.

A computer program embodying various embodiments may be stored on a computer-readable medium, or it may, for example, be in the form of a signal such as a downloadable data signal provided from an Internet website, or it may be in any other form.

To summarise, some embodiments provide a method for configuring a search space within which a mobile terminal performs blind decoding attempts for potential control message candidates which may be transmitted by a base station. The frequency domain resource for which the terminal performs a blind decoding attempt for a given candidate message is determined by a pseudo-random selection (known by both terminal and network) from a pre-determined set of possible resources. A difference from prior art is that pre-determined set of resources can be different for each candidate. In a preferred embodiment the set of resources is configured by the network for each terminal and each candidate.

INDUSTRIAL APPLICABILITY

Allowing DCI messages to be transmitted on the EPDCCH rather than the PDCCH reduces the loading on PDCCH and improves control channel efficiency (in terms of resources use).

The main advantage of some of the embodiments, when applied to ePDCCH in LTE, is that when serving multiple terminals the network can choose sets of resources for each terminal such that a good balance between conflicting requirements can be achieved: control message can be transmitted in frequency domain locations with suitable channel and interference conditions for each terminal; the terminal does not need to blind decode too many candidates; the resources occupied by control messages are used efficiently; and the probability is minimized of a control message for one terminal blocking transmission of a message to another terminal in the same resource. The method also allows simple implementation for both network and terminals.

What is claimed is:

1. A wireless communication method in which a wireless network transmits a control channel message for receipt by a terminal, the method comprising, at the wireless network side:
configuring a plurality of search spaces, each of the plurality of search spaces being configured from a plurality of control channel elements within a time interval for scheduling decision by using a pseudo-random function;
determining one or more control channel elements to use for transmission of the control channel message within the plurality of search spaces; and
transmitting the control channel message located in the one or more control channel elements; and at the terminal side:
decoding the control channel message by making a selection of locations for blind decoding the plurality of search spaces within the time interval, using the pseudorandom function,
wherein, the pseudo-random function is a function based on a sum of a first value and a second value,
wherein the first value is a pseudo-random factor, and the second value is based on an aggregation level and a number of PDCCH (Physical Downlink Control Channel) candidates of a search space that is included in the plurality of search spaces.

2. The method according to claim 1, wherein resources corresponding to a search space for each of the plurality of control channel elements are configured such that the resources are adjacently located in adjacent frequency domain locations.

3. The method according to claim 1, wherein an amount of resources used for the transmission of the control channel message has one of a plurality of sizes depending on the aggregation level.

4. The method according to claim 1, wherein the pseudo-random factor, $Y_k$, is defined as:

$$Y_k = (A \cdot Y_{k-1}) \bmod D$$

where $Y_{-1} = n_{RNTI} \neq 0$, A and D are different fixed values, k is a number corresponding to the time interval, and $n_{RNTI}$ is a radio network temporary identifier.

5. The method according to claim 1 wherein the plurality of the control channel elements are configured from available resource.

6. A base station for use in a wireless communication system and arranged to transmit a control channel message, the base station comprising:
a configurer configured to configure a plurality of search spaces, each of the plurality of search spaces being configured from a plurality of control channel elements within a time interval for scheduling decision by using a pseudo-random function;
a scheduler configured to determine one or more control channel elements to use for transmission of the control channel message within the plurality of search spaces, and
a transmitter configured to transmit the control channel message located in the one or more control channel elements,
wherein, the pseudo-random function is a function based on a sum of a first value and a second value,
wherein the first value is a pseudo-random factor, and the second value is based on an aggregation level and a total of control channel elements in the time interval.

7. The base station according to claim 6, wherein an amount of resources used for the transmission of the control channel message has one of a plurality of sizes depending on the aggregation level.

8. The base station according to claim 6, wherein the pseudo-random factor, $Y_k$, is defined as:

$$Y_k = (A \cdot Y_{k-1}) \bmod D$$

where $Y_{-1} = n_{RNTI} \neq 0$, A and D are different fixed values, k is a number corresponding to the time interval, and $n_{RNTI}$ is a radio network temporary identifier.

9. The base station according to claim 6 wherein the plurality of the control channel elements are configured from available resource.

10. A terminal for use in a wireless communication network, the wireless communication network arranged to transmit at least one control channel message to the terminal, wherein the terminal comprises:
a receiver configured to receive the control channel message located in one or more control channel elements within a plurality of search spaces, each of the plurality of search spaces being configured from a plurality of control channel elements within a time interval for scheduling decision by using a pseudorandom function;
a decoder configured to decode the control channel message by making a selection of locations for blind decoding the plurality of search spaces within the time interval, using the pseudorandom function,
wherein, the pseudo-random function is a function based on a sum of a first value and a second value,
wherein the first value is a pseudo-random factor, and the second value is based on an aggregation level and a total of control channel elements in the time interval.

11. The terminal according to claim 10, wherein an amount of resources used for the transmission of the control channel message has one of a plurality of sizes depending on the aggregation level.

12. The terminal according to claim 10, wherein the pseudo-random factor, $Y_k$, is defined as:

$$Y_k = (A \cdot Y_{k-1}) \bmod D$$

where $Y_{-1} = n_{RNTI} \neq 0$, A and D are different fixed values, k is a number corresponding to the time interval, and $n_{RNTI}$ is a radio network temporary identifier.

13. The terminal according to claim 10 wherein the plurality of the control channel elements are configured from available resource.

* * * * *